Feb. 18, 1936.  R. C. McKAY  2,031,274
APPARATUS FOR COOLING WARM MILK
Filed Sept. 16, 1935  2 Sheets-Sheet 1

INVENTOR:

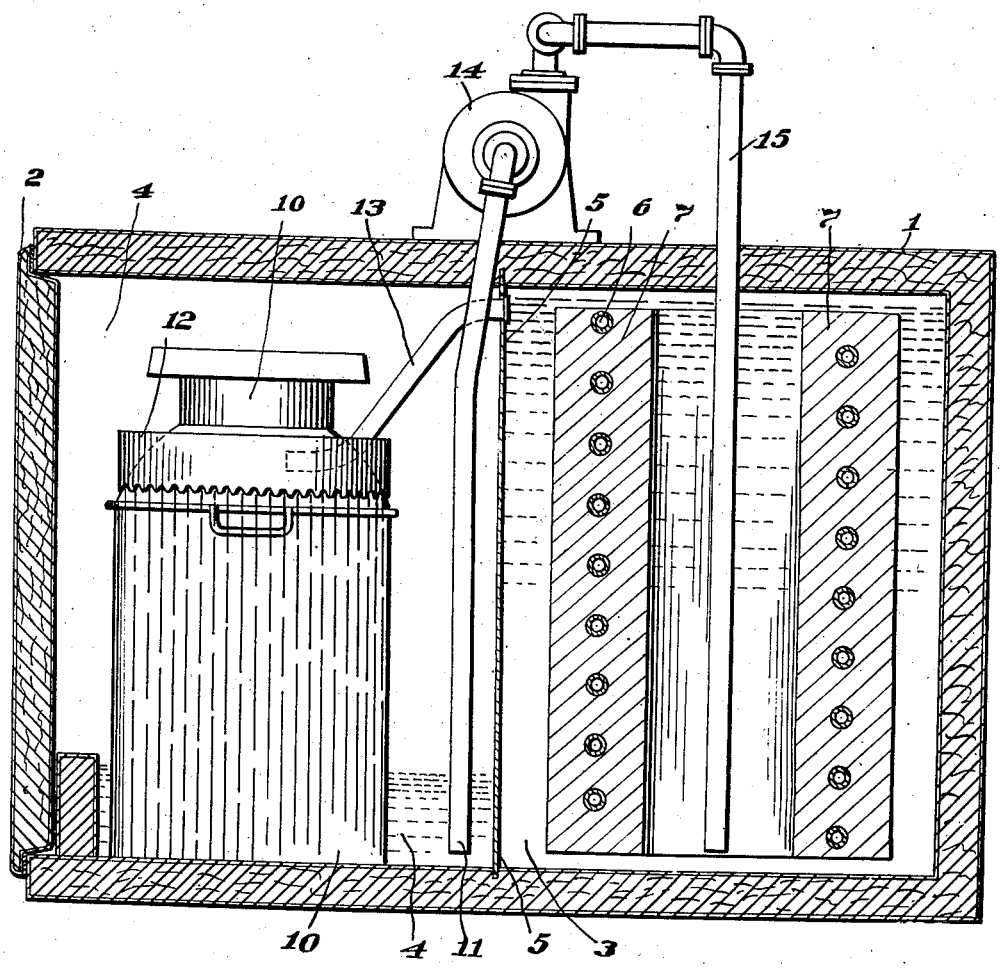

Patented Feb. 18, 1936

2,031,274

UNITED STATES PATENT OFFICE 2,031,274

APPARATUS FOR COOLING WARM MILK

Robert C. McKay, Swampscott, Mass.

Application September 16, 1935, Serial No. 40,712

4 Claims. (Cl. 257—215)

This invention relates to apparatus for cooling warm milk. The two types of milk cooling apparatus in general use may be classified as coolers which cool the warm milk in the cans in which it is collected and shipped and those which cool the warm milk by pouring it directly over coils in which a cold liquid is being circulated. This invention relates to coolers of the first class where the milk is cooled in containers. This type of cooler usually consists of an insulated tank filled with cold water, in which the cans are immersed. The water is cooled either by mixing it with ice broken into relatively small pieces or by running artificial freezing coils through the tank which may or may not freeze a cake of ice within the tank. The development of this type of tank has recognized two important difficulties and various means have been adopted to eliminate them. First it was recognized that very much better results were obtained by providing an agitation of the water in the tank either by stirring it or circulating the water by means of a pump. Another difficulty which has been recognized is the loss of efficiency due to the loss of cold water displaced by the milk cans. Very little, if any, attention has been paid, however, to the circulation of milk inside the can which, I believe, is more important than the circulation of water on the outside of the can.

One important object of this invention is to provide a simple and inexpensive means of increasing the rate of the circulation of milk inside the can and thus increase the efficiency of the apparatus and reduce the time required to cool the milk which, of course, reduces the bacteria count in the cold milk.

Another very important objection to the conventional type of milk cooler on the part of dairy farmers has been the necessity of lifting the heavy forty-quart cans to the top of the tank. Another object of my invention, therefore, is to provide a milk cooler in which the cans are inserted through a door at the side of the tank.

Further objects of the invention are to prevent the spilling of cold water when the milk containers are set in the tank to reduce the amount of water required in performing the cooling operation, to devise a more efficient construction, to reduce the liability of contamination of the milk, and to devise a construction which can be easily kept in a thoroughly clean and sanitary condition.

Other objects will appear from the following description, reference being had to the accompanying drawings, in which:

Fig. 2 is a cross section of the apparatus on the line 2—2, Fig. 1.

Briefly stated, the method provided by this invention consists of providing a supply of cooling water or other liquid and directing its flow so the upper portion of the can is kept at a lower temperature than the lower portion of the can during the cooling process. This increases the rate of circulation of the warm milk in the can as compared with other apparatus of the same general character and reduces the time required in cooling. Although my invention is herein disclosed as using water as a cooling agent, it is evident that any other liquid may be substituted for water.

Figure 1:
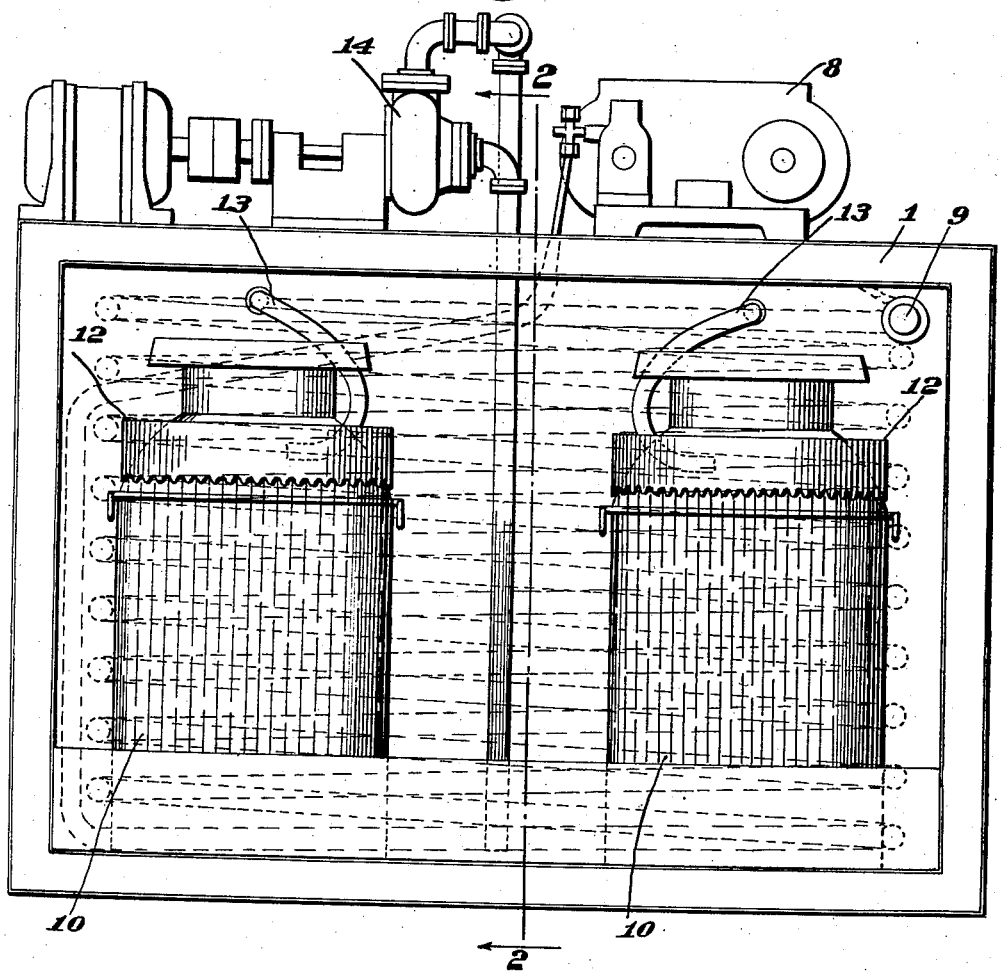
Fig. 1 is a side view of the apparatus with the door removed.
Figure 3:
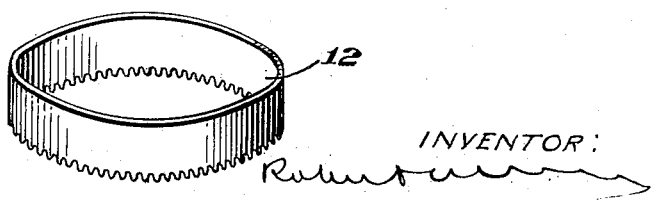
Fig. 3 is a perspective view of the removable collar which is placed on a can of milk before it is inserted in the apparatus.

Referring to Figs. 1 and 2, the apparatus there shown comprises a conventional type of insulated milk tank 1 except that a door 2 is provided at the side instead of the customary hinged cover on the top. Tank 1 is divided into compartments 3 and 4 by partition 5. Compartment 3 is filled with water which is cooled by expansion coil 6 which in the normal operation of the apparatus will be surrounded by a cake of ice 7. The expansion coil 6 is connected with a conventional type of refrigerator compressor 8 through expansion valve 9. Compartment 4 is arranged to hold two cans of milk 10 and contains sufficient water so that the opening at the end of intake pipe 11 is always covered with water during the operation of the apparatus. Preferably but not necessarily each can 10 is provided with a removable collar 12 designed to distribute the water around the top portion of the can 10 but below the cover of the can. The cold water is forced into collar 12 through hose 13 by the action of a conventional type of gear pump 14 taking the water from the bottom of compartment 4 through intake pipe 11 and forcing it to the bottom of compartment 3 through outlet pipe 15 running through the center of the ice cake 7. This action causes the cold water from the top of compartment 3 to flow through the hose 13 into the space between the collar 12 and the top of can 10 where it is distributed more or less evenly around the can 10 flowing down the sides to the bottom of compartment 4. From this description it will be seen that the circulation of the water is from the bottom of compartment 4 to the bottom of compartment 3, thence upwardly around the cake of ice 7, through hose 13 to the top portion of can 10, down the side of can 10 to the bottom of compartment 4. The temperature of the water will increase as it passes down the side of the can and its cooling effect will diminish. The result is that the top portion of the can is kept at a lower temperature than the lower portion until the temperature of the milk inside the can tends to equalize with the temperature of the water in compartment 3.

This invention in effect reverses the method employed in the conventional type of milk cooler. Instead of having the coldest water at the bottom of the can with the temperature gradually increasing toward the top in spite of any agitation, this invention applies the coldest water to the upper part of the can with the temperature gradually increasing toward the bottom. It seems obvious that this will increase the rate of circulation of the milk but I do not wish to limit my invention to any particular theory of what occurs inside the can of milk, as tests have proved that the milk will be cooled much more rapidly than in the conventional tank type of milk cooler.

In operation, the refrigerator compressor should preferably be operated a sufficient length of time to build a cake of ice around the expansion coil before inserting the cans of milk. The collars 12 may then be placed over the neck of each can and the cans are then inserted in the cabinet. The hose 13 should be inserted between the collar and the can so as to direct the flow of water around the can. The pump is then started and allowed to run until the milk has reached the desired temperature. The pump can then be shut off and the milk can be stored in the apparatus and its temperature maintained.

While I have herein shown and described a typical embodiment of my invention, it will be evident that the invention may be embodied in other forms without departing from the spirit or scope thereof.

The claims in the present application are confined to the cooling cabinet organization. No claim is made here to the unique manner in which the flow of water in contact with the container is distributed and controlled, but this subject matter is claimed in a continuing application, Serial No. 60,008, filed January 21, 1936.

Having thus described my invention, what I claim is:

1. In an apparatus of the class described, the combination of a cooling cabinet with two compartments, means for building a hollow cake of ice in one compartment, means for causing water to flow from the ice compartment over a milk container placed in the other compartment, and means for returning the water from the bottom of the container compartment to the bottom of the ice compartment under the hollow portion of the cake of ice.

2. A milk cooling apparatus comprising a cabinet having two compartments therein, means for maintaining one compartment substantially filled with water and a relatively small quantity of water in the second compartment, said second compartment being adapted to hold a milk container, means for cooling the water in the first compartment sufficiently to produce a cake of ice therein, means for causing the water to flow around said cake of ice and then into contact with the top and down the sides of a milk container placed in the second compartment, and means for returning the water to the ice compartment after it has passed over the milk container.

3. A cabinet for cooling warm milk held in removable containers which comprises an insulated tank with two compartments separated by a partition designed to maintain water at a high level in one compartment and at a low level in the other, means for cooling the water placed in the high level compartment, means for causing the water to flow from the low level compartment through the high level compartment and back to the upper part of the low level compartment, and means for directing the flow over the top portion of containers of warm milk placed in the low level compartment.

4. A cabinet for cooling warm milk held in removable containers which comprises an insulated tank with a door opening at the side thereof and with two compartments separated by a partition designed to maintain water at a high level in one compartment and at a low level in the other, means for cooling the water placed in the high level compartment, means for causing the water to flow from the low level compartment through the high level compartment and back to the upper part of the low level compartment, and means for directing the flow over the top portion of containers of warm milk placed in the low level compartment.

ROBERT C. McKAY.